United States Patent Office 2,780,576
Patented Feb. 5, 1957

2,780,576
ANAESTHETIC MIXTURE

Werner Keil, Moers, Germany, assignor to Rheinpreussen Aktiengesellschaft für Bergbau und Chemie, Homberg, (Lower Rhine), Germany, a corporation of Germany No Drawing. Application July 15, 1952,
Serial No. 299,009

Claims priority, application Germany December 24, 1951

8 Claims. (Cl. 167—52)

This invention relates to an improved anaesthetic mixture.

Alkaline esters of p-aminobenzoic acid including the p-aminobenzoic acids which have been monoalkylated on the amino group such as diethylaminoethyl and dimethylaminoethyl esters are known as anaesthetics.

It has been found that the analogous esters of aminohydroxybenzoic acids, such as 4-amino-2-hydroxybenzoic acid, are superior to the above-mentioned alkamine esters of p-aminobenzoic acid with respect to their use as anaesthetics. These esters of amino hydroxy benzoic acids are not only superior to the alkamine esters of p-aminobenzoic acid with respect to their anaesthetizing action, but are surprisingly much less toxic in use.

Thus, for example, the diethylaminoethyl ester of p-aminosalicylic acid when compared with diethylaminoethyl ester of p-aminobenzoic acid has the advantage that anaesthesia will set in more quickly and will last longer. When combined with vasoconstrictory agents such as "Adrenalin," "Corbasil" or "Noradrenalin," anaesthesia is reached with smaller doses when using diethyl aminoethyl ester of p-amino salicylic acid than when using diethyl aminoethyl ester of p-amino benzoic acid. The toxicity of diethyl aminoethyl ester of p-amino salicylic acid when used alone is somewhat higher than that of diethyl aminoethyl ester of p-amino benzoic acid. Whenever the anaesthetics are combined with vasoconstrictory agents, the toxicity of the two substances, i. e., the diethyl aminoethyl ester of p-amino salicylic acid and the diethyl aminoethyl ester of p-amino benzoic acid, become practically equal, as is evident from Table 1 below.

Table 1

| | Mouse, LD$_{50}$ I. P. | |
|---|---|---|
| | Diethyl aminoethyl ester of p-amino salicylic acid, mg./kg. | Diethyl aminoethyl ester of p-amino benzoic acid, mg./kg. |
| Without Addition of Vasoconstringents | 125 | 167 |
| Addition of 5 mg. Percent Adrenalin | 110 | 110 |
| Addition of 30 mg. Percent Corbasil (Lirotil) | 120 | 139 |
| Addition of 10 mg. Percent Noradrenalin | 141 | 145 |

As can further be seen from Table 1, the increase in toxicity effected by the addition of the vasoconstrictory agent, is smaller with the alkamine esters of p-aminosalicylic acid than with the alkamine esters of p-aminobenzoic acid. In the case of the alkamine esters of p-aminosalicylic acid, as, for example, diethyl aminoethyl ester of p-amino salicylic acid, the use of noradrenalin as the vasoconstrictory agent very surprisingly decreases the toxicity instead of increasing it, as in the case of the alkamine esters of p-aminobenzoic acid.

The alkamine esters of p-aminosalicylic acid have an additional marked superiority to the alkamine esters of p-aminobenzoic acid. The ester splitting caused by esterases in the case of the former, will result in the formation of the bacteriostat p-aminosalicylic acid, while in the case of the latter, p-aminobenzoic acid is formed, which is a growth-promoting substance of bacteria. The p-aminosalicylic acid formed by the ester splitting in the former case will cause considerably less reactive aftereffects than is the case when using alkamine esters of p-aminobenzoic acid, especially with anaesthesia in the inflammatory zone.

The alkamine esters of p-aminosalicylic acids monoalkylated at the nitrogen atom on the benzene ring, are excellent surface anaesthetics and are distinguished from the analogous esters of p-aminobenzoic acid by the advantage of offering equal anaesthesia and compatibility with about one-third the toxicity. This will become apparent from Table 2 below, in which dimethylaminoethyl ester p-n-butylaminosalicylic acid and diethylaminoethyl ester of p-n-butylaminosalicylic acid are compared with diethylaminoethyl esters of p-n-butylaminobenzoic acid.

Table 2

| | Dimethyl aminoethyl ester of p-n-butylamino salicylic acid, mg./kg. | Diethyl aminoethyl ester of p-n-butylamino salicylic acid, mg./kg. | Diethyl aminoethyl ester of p-n-butylamino benzoic acid, mg./kg. |
|---|---|---|---|
| Rat; LD$_{50}$ I. P. | 90 | 62 | 32 |
| Mouse; LD$_{50}$ I. V. | 30 | 16 | 9.5 |

It has now very surprisingly been found that a very large increase in the anaesthesizing action is obtained when using a mixture of the alkamine esters of 4-amino-2-hydroxy-benzoic acid with the alkamine esters of N-substituted 4-amino-2-hydroxy-benzoic acid. This increase in activity goes far beyond the purely additive effects, and could not at all be expected. Due to the bacteriostatic and antimycotic properties of the alkamine esters of p-aminosalicylic acids monoalkylated at the nitrogen atom, especially of the dimethylaminoethyl ester of p-N-butylaminosalicylic acid, such mixtures have the marked additional advantage in that their solutions are autosterile.

The mixtures in accordance with the invention should contain 80–99% by weight of the alkamine ester of 4-amino-2-hydroxybenzoic acid and the remainder of the percentage by weight, i. e. 1–20% of the alkamine ester of the 4-amino-2-hydroxybenzoic acid which is substituted at the nitrogen atom on the benzene ring.

The alkamine esters of the 4-amino-2-hydroxy-benzoic acid which are present in amounts of 80–99% by weight in the mixture, may be any of the alkamine esters having the general formula

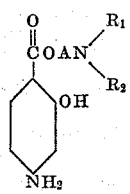

in which A represents a straight or branched saturated hydrocarbon radical containing 2 to 12 carbon atoms. This radical may contain substituents as, for example, aliphatic or aromatic hydrocarbon groups such as a methyl or phenol group or by a halogen atom such as bromide. The R$_1$ and R$_2$ in the formula may be any alkyl, aryl or alkaryl groups containing up to 10 carbon atoms, It is preferable that the A represent a saturated aliphatic hydrocarbon radical having a straight chain and containing two or three carbon atoms, and that the $R_1$ and $R_2$ be ethyl or methyl groups, i. e., diethyl or dimethyl amino esters.

The alkamine esters of the 4-amino-2-hydroxy-benzoic acid substituted at the nitrogen atom may be any compound having the general formula

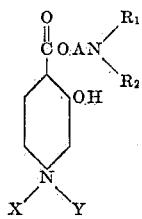

in which A, $R_1$ and $R_2$ have the same meaning as in Formula 1 above, and in which X may be any of a hydrogen atom, an alkyl group, an aryl group, or an alkaryl group, having up to 10 carbon atoms and in which Y may be an alkyl group, an aryl group, or an alkaryl group, having up to 10 carbon atoms. It is preferable that the nitrogen atom on the benzene ring be monosubstituted and preferably monoalkylated with an alkyl group containing up to 4 carbon atoms. The A is preferably a straight-chained saturated hydrocarbon radical having 2 to 3 carbon atoms, and the $R_1$ and $R_2$ are preferably methyl or ethyl groups.

In the following examples a mixture of diethylaminoethyl ester of p-aminosalicylic acid, which will be referred to as diethyl aminoethyl ester of p-amino salicylic acid and 3% of dimethyl aminoethyl ester of p-n-butyl-amino salicylic acid was used. The anaesthetic action was determined by Regnier's test in a rabbit's eye. Table 3 below shows the compositions of the solutions used, the duration of the anaesthesia for each of the solutions, and the materially prolonged anaesthesia duration for the solution mixtures.

*Table 3*

| | | | |
|---|---|---|---|
| Mixture of diethyl aminoethyl ester of p-amino salicylic acid and dimethyl aminoethyl ester of p-n-butylamino salicylic acid contained in the solution_____percent__ | 0.125 | 0.25 | 0.5 |
| Diethyl aminoethyl ester of p-amino salicylic acid contained in the solution_____percent__ | 0.121 | 0.242 | 0.485 |
| Duration of anaesthesia of such a solution of diethyl aminoethyl ester of p-amino salicylic acid alone_____min__ | 0 | 0 | 5.5 |
| Dimethyl aminoethyl ester of p-n-butylamino salicylic acid contained in the solution _____percent__ | 0.0037 | 0.0075 | 0.015 |
| Duration of anaesthesia of such a solution of dimethyl aminoethyl ester of p-n-butyl-amino salicylic acid alone_____min__ | 0 | 0 | 6 |
| Sum of durations of the two anaesthetics, each applied separately__min__ | 0 | 0 | 11.5 |
| Actual duration of anaesthesia of the mixture of the two anaesthetics_____min__ | 11 | 16 | 22 |

Similar conditions were found when using mixtures of the dimethylaminoethyl ester of p-aminosalicylic acid with dimethyl aminoethyl ester of p-n-butylamino salicylic acid or diethyl aminoethyl ester of p-n-butylamino salicylic acid, respectively.

The addition of the alkamine esters of N-substituted 4-amino-2-hydroxybenzoic acids amounts, as has been mentioned, to 1–20% by weight. Small additions of about 3% by weight will already show a considerable increase in the anaesthetic action, while the use of more than 20% by weight of the additive is not desirable.

Apart from this marked increase in the anaesthesizing action, these mixtures very surprisingly show a considerably lower toxicity than their individual components, which, of course, would not at all be expected. This may be seen from Table 4 below.

*Table 4*

MOUSE; $LD_{50}$ i. p.

| | Mg./kg. |
|---|---|
| Diethyl aminoethyl ester of p-amino salicylic acid, separately | 125 |
| Dimethyl aminoethyl ester of p-n-butylamino salicylic acid, separately | 100 |
| Diethyl aminoethyl ester of p-n-butylamino salicylic acid, separately | 97 |
| Diethyl aminoethyl ester of p-amino salicylic acid + 3% of dimethyl aminoethyl ester of p-n-butyl-amino salicylic acid | 160 |
| Diethyl aminoethyl ester of p-amino salicylic acid + 15% of diethyl aminoethyl ester of p-n-butylamino salicylic acid | 157 |

It may be noted that the increase in the local anaesthetic action of the mixture of the alkamine esters of p-aminosalicylic acid and of the p-n-butylaminosalicylic acid is not accompanied by an increase in toxicity, as is the case, for example, when using mixtures of the alkamine esters of p-aminobenzoic and of p-n-butylamino-benzoic acid (diethyl aminoethyl ester of p-amino benzoic acid and diethyl aminoethyl ester of p-n-butylamino benzoic acid, respectively). When adding 7–15% of diethyl aminoethyl ester of p-n-butylamino benzoic acid, to diethyl aminoethyl ester of p-amino benzoic acid, the toxicity will increase by 10–15%. For example, two commercial solutions should be mentioned in which the increase in toxicity is heavily pronounced, especially when they are administered intravenously, which may easily occur by mistake in the clinic. This is set forth in Table 5 below.

*Table 5*

MOUSE; $LD_{50}$ i. v.

| | Mg./kg. |
|---|---|
| Diethyl aminoethyl ester of p-amino benzoic acid + Lirotil (commercial product) | 16 |
| Diethyl aminoethyl ester of p-amino benzoic acid + diethyl aminoethyl ester of p-n-butylamino benzoic acid + Lirotil (0.02 gram + 0.0015 gram + 0.001 gram) (commercial product) | 9.2 |

The mixtures in accordance with the invention are not only suitable for the treatment of human patients, but are also excellently suited for use in veterinary medicine. They have particular value in that small amounts of solution are sufficient for the anaesthetizing purposes. With large animals, especially in lumbal anaesthesia, this offers an additional advantage to the veterinarian.

In the clinical examination of the mixtures, according to the invention, the following characteristics, apart from the pharmacological advantages mentioned above, were found:

(1) Very quick set-in of anaesthesia, quicker than with procaine.

(2) Long-lasting anaesthesia.

(3) Formation of bacteriostatic, non-toxic cleavage products.

(4) Low toxicity; aggregate toxicity lower than the toxicities of the individual components.

(5) No allergic effects. Even in cases of allergy to derivatives of p-aminobenzoic acid, the new mixtures may still be used.

(6) No reactive after-effects in the inflammable tissue owing to the intermediate formation of bacteriostatic p-aminosalicylic acid.

(7) The solutions of the new mixed anaesthetics are autosterile.

All the other requirements of a good local anaesthetic, such as compatibility with the tissue, isotonic qualities, stability, insensitivity to high temperatures, good combinability with vasoconstringents and vasoconstrictory agents were also found in the new mixture in accordance with the invention.

The alkamine esters of 4-amino-2-hydroxybenzoic acid substituted at the nitrogen atom on the benzene ring may be produced, for example, by esterifying an aminooxy-benzoic acid which is substituted on the nitrogen atom with a nitrogen substituted amino alcohol, and recovering the alkamine ester. Processes for the production of these esters are set forth in a work by Walter Grimme and Heinrich Schmitz in "Chemische Berichte," vol. 84, 1951, pages 734–744.

The alkamine esters of 4-amino-2-hydroxy benzoic acid may be prepared by reacting 4-nitro salicylic acid in an organic solvent such as methylene bichloride benzene, or carbon tetrachloride, etc., with thionyl chloride to produce nitro salicylic acid chloride, which is recovered. The nitro salicylic acid chloride is then reacted with the desired amino alcohol to produce the alkamine ester of the 4-nitro salicylic acid. This compound is then reduced with hydrogen in the presence of a suitable noble catalyst, and the nitro group is converted to the free amino group.

In the tables, the $LD_{50}$ is used in its conventional sense and represents the lethal dose for 50% of the animals treated. The I. V. indicates that the substance is injected intravenously, and the I. P. indicates that the substance is injected intraperitoneally. The mg./kg. represent the number of milligrams injected per kilogram of weight of the animal.

Among particularly suitable anaesthetic mixtures according to the invention are the following:

1. A mixture of diethyl aminoethyl ester of p-amino salicylic acid and dimethyl aminoethyl ester of p-n-butyl-amino salicylic acid.
2. A mixture of diethyl aminoethyl ester of p-amino salicylic acid and diethyl aminoethyl ester of p-n-butyl-amino salicylic acid.
3. A mixture of dimethyl aminoethyl ester of p-amino salicylic acid and dimethyl amino-ethyl ester of p-n-butyl-amino salicylic acid.
4. A mixture of dimethyl aminoethyl ester of p-amino salicylic acid and diethyl aminoethyl ester of p-n-butyl-amino salicylic acid.

We claim:

1. A new anaesthetic comprising a mixture of an alkamine ester of 4-amino-2-hydroxy-benzoic acid, and an alkamine ester of N-substituted 4-amino-2-hydroxy-benzoic acid, the 4-amino group of said N-substituted 4-amino 2-hydroxy benzoic acid having at least one hydrogen atom thereof substituted with an alkyl radical containing up to 10 carbon atoms said last-mentioned component being present in amount of 1–20% by weight.

2. Anaesthetic according to claim 1, in which said alkamine ester of N-substituted 4-amino-2-hydroxy-benzoic acid is mono-substituted.

3. Anaesthetic according to claim 2, in which said alkamine ester of N-substituted 4-amino-2-hydroxy benzoic acid is mono-alkylated with an alkyl radical containing up to 4 carbon atoms.

4. Anaesthetic according to claim 1, in which said alkamine esters are selected from the group consisting of diethylaminoesters and dimethylaminoesters.

5. Anaesthetic according to claim 1, consisting of a mixture of diethylamino-ethyl ester of p-aminosalicylic acid and dimethylaminoethyl ester of p-n-butylaminosalicylic acid.

6. Anaesthetic according to claim 1, consisting of a mixture of diethylaminoethyl ester of p-aminosalicylic acid and diethyl aminoethyl ester of p-n-butylaminosalicylic acid.

7. Anaesthetic according to claim 1, consisting of a mixture of dimethylaminoethyl ester of p-aminosalicylic acid and dimethylaminoethyl ester of p-n-butylaminosalicylic acid.

8. Anaesthetic according to claim 1, consisting of a mixture of dimethylaminoethyl ester of p-aminosalicylic acid and diethylaminoethyl ester of p-n-butylaminosalicylic acid.

References Cited in the file of this patent

FOREIGN PATENTS

| | | |
|---|---|---|
| 349,640 | Great Britain | June 4, 1931 |
| 270,986 | Switzerland | Dec. 16, 1950 |

OTHER REFERENCES

Luduena (1): Federation Proceedings, vol. 9, March 1950, p. 297. (Copy in Sci. Libr.)

Luduena (2): Journal of Pharmacology and Experimental Therapeutics, vol. 104, January 1952, pp. 40 to 53. (Copy in Sci. Libr.)

Keil, Brautigam, Holler: Arzheimittel Forschung, March 1952, pp. 112, 113.

Hemming: Antibiotics and Chemotherapy, vol. III, June 1953, pp. 638, 639.